(12) United States Patent
Keppel et al.

(10) Patent No.: US 7,534,401 B2
(45) Date of Patent: May 19, 2009

(54) ARCING ELECTRON STREAM APPARATUS AND METHOD

(75) Inventors: Paul D. Keppel, Mooresville, NC (US); Randolph M. Wilson, Charlotte, NC (US)

(73) Assignee: Global Environmental Concepts, LLC, Carson City, NV (US)

( * ) Notice: Subject to any disclaimer, the term of this patent is extended or adjusted under 35 U.S.C. 154(b) by 407 days.

(21) Appl. No.: 10/966,599

(22) Filed: Oct. 15, 2004

(65) Prior Publication Data

US 2005/0199408 A1    Sep. 15, 2005

Related U.S. Application Data

(60) Continuation-in-part of application No. 09/907,260, filed on Jul. 17, 2001, now abandoned, which is a continuation-in-part of application No. 09/858,129, filed on May 15, 2001, now abandoned, which is a division of application No. 09/809,990, filed on Mar. 16, 2001, now Pat. No. 6,508,991.

(51) Int. Cl.
*B01J 19/08* (2006.01)

(52) U.S. Cl. .................. 422/186.21; 204/164; 204/178

(58) Field of Classification Search ............ 422/186.21; 204/164, 178; 60/275
See application file for complete search history.

(56) References Cited

U.S. PATENT DOCUMENTS 5,807,526 A    9/1998  Miljevic
5,822,980 A *  10/1998 Chen .......................... 60/274
5,953,909 A *  9/1999  Waltrip, III .................. 60/275
6,119,455 A    9/2000  Hammer et al.
6,508,991 B2 * 1/2003  Keppel .................. 422/186.21

FOREIGN PATENT DOCUMENTS

JP    63272911 A    11/1988
JP    11093644 A    4/1999

OTHER PUBLICATIONS

B.M. Penetrante et al., Plasma-Assisted Catalytic Reduction of NOx, 1998, all pages, SAE Publications Group, Warrendale, PA, USA.

* cited by examiner

*Primary Examiner*—Kishor Mayekar
(74) *Attorney, Agent, or Firm*—Everman Law Firm, PA; Gregory R. Everman

(57) ABSTRACT

An arcing electron stream apparatus and method for reducing pollutants in a fluid. The device includes first and second electrodes and a chamber there-between. Voltage is impressed between the electrodes at a frequency, thereby causing a plurality of arcing electron streams to occur between the electrodes. The electrodes have stepped surface such that the central first section of the electrodes are in closer proximity to each other than are the outer second sections. This stepped configuration causes arcing electron streams to progressively be formed along the electrodes and, thus, traverse throughout the chamber, thereby effectively treating molecules within the chamber.

15 Claims, 6 Drawing Sheets

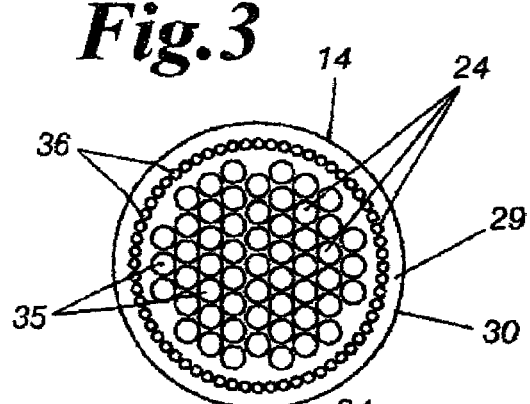
Fig.3
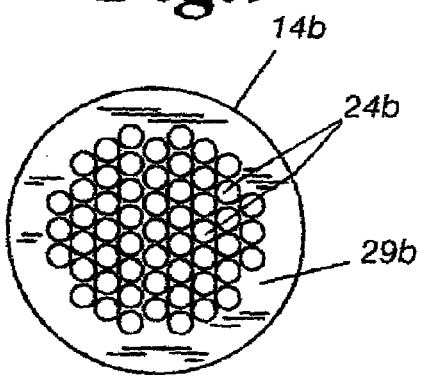
Fig.9
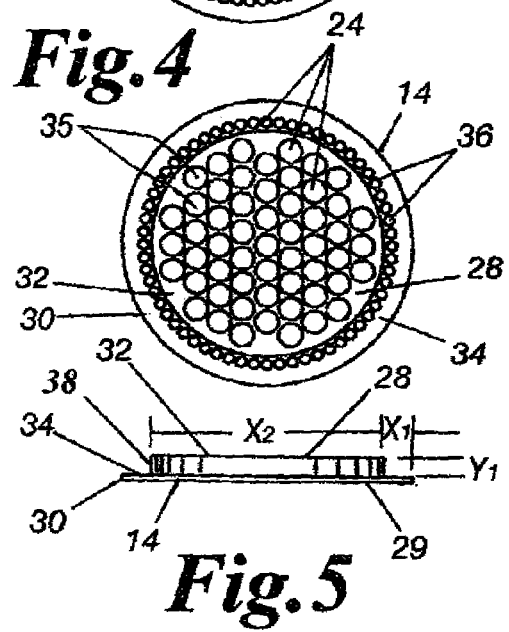
Fig.4
Fig.5
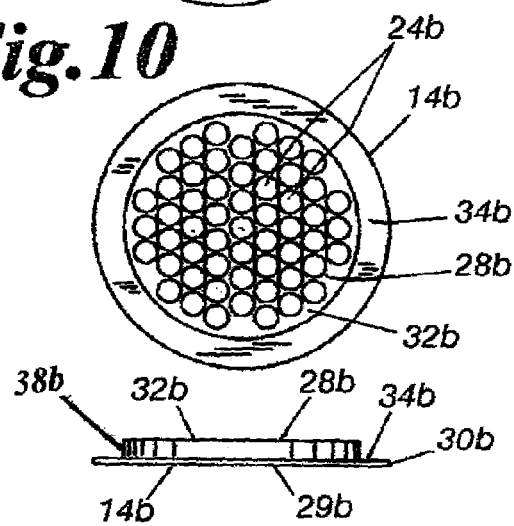
Fig.10
Fig.11

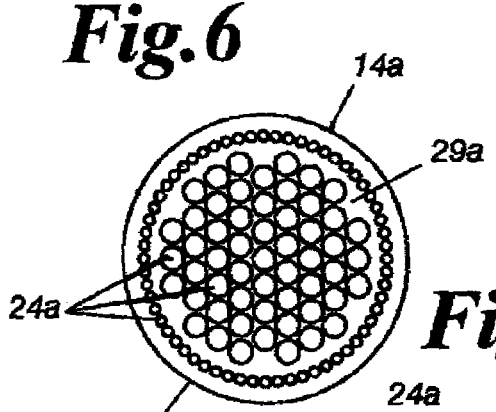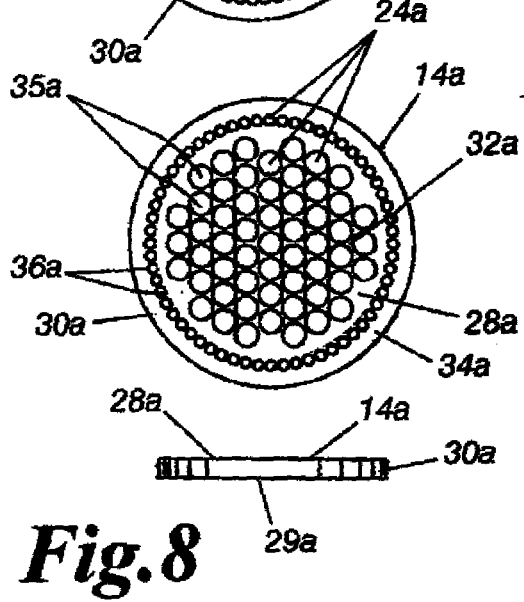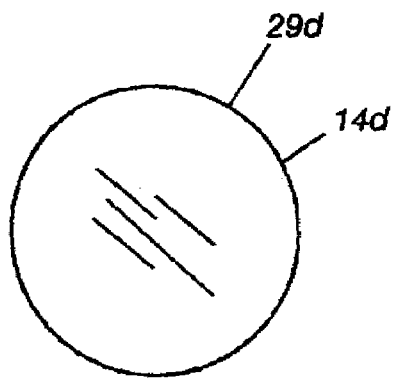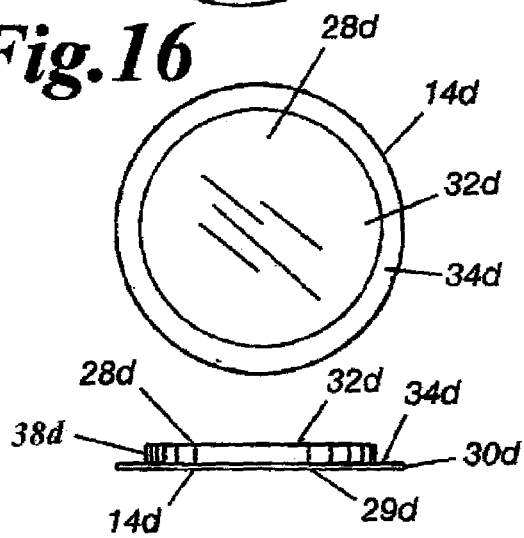

ARCING ELECTRON STREAM APPARATUS AND METHOD

CROSS REFERENCE TO RELATED APPLICATIONS

This application is a continuation-in-part of U.S. application Ser. No. 09/907,260, filed Jul. 17, 2001, now abandoned, which is a continuation-in-part of U.S. application Ser. No. 09/858,129, filed May 15, 2001, now abandoned, which is a divisional of U.S. application Ser. No. 09/809,990, filed Mar. 16, 2001, now U.S. Pat. No. 6,508,991 B2, each of which are hereby incorporated by reference.

BACKGROUND OF THE INVENTION

1. Field of the Invention

The present invention relates generally to the field of environmental control devices and methods and, more specifically, to electrical arcing environmental devices for reducing emissions in an exhaust stream and, also, for generating ozone for other environmental purposes.

2. Description of the Related Art

Combustion engines of automobiles, trucks, aircraft, and other sources emit millions of tons of pollutants, such as, oxides of nitrogen, hydrocarbons, carbon monoxide, carbon dioxide, and air toxics, every year. Other significant contributors to air pollution include, for example, electrical power generators, coating processes, and solid waste incineration, among others. Due to expanding industrialization and increasing world-wide use of automobiles, the problems caused by air pollution are an ongoing and increasing concern.

Generated pollutants degrade public health and damage the environment. For example, carbon monoxide, a toxic by-product of incomplete combustion, is a major contributor to air pollution and effects public health. As another example, carbon dioxide, although non-toxic, directly contributes to the "greenhouse effect". Moreover, hydrocarbons may cause eye irritation, nasal congestion and breathing difficulties. And, air toxics are carcinogenic.

In an effort to curb air pollution, many countries have promulgated air pollution emission standards that require pollution sources to be controlled by best available technology. Such known pollution control technology includes electrostatic precipitators, wherein a voltage difference is impressed between electrodes positioned in an exhaust stream. The voltage ionizes gas particles in the exhaust stream, which in turn causes particulate matter that is suspended in the gas to acquire a charge from being in contact with the ionized gas particles. The charged particles are then collected at oppositely charged diodes that must be routinely "cleaned" or "scrubbed". A significant drawback of electrostatic precipitation is that only minute particulate matter can be precipitated out of the exhaust stream. Moreover, this process is ineffective at removing gaseous contaminants such as oxides of nitrogen, carbon dioxide, carbon monoxide, and air toxics.

Other conventional air pollution control devices include baghouses and cyclones which are used to control emissions of particulate matter. Baghouses remove particulate matter by placing a plurality of filter bags in an exhaust stream. The bags filter entrained particulate matter from the exhaust stream as it passes there-through. Cyclones remove particular matter by directing the air stream in a spiral motion whereby tangentially moving particles settle out of the air stream due to the laminar boundary layer formed along the interior surface of the cyclone. Both of these air pollution control devices are subject to spontaneous combustion and, thus, are not suitable for use in high temperature environments. Moreover, both control devices are ineffective at removing gaseous pollutants and require considerable maintenance.

Still other conventional air pollution control devices include burners, granular activated carbon and water curtains. These control devices are typically used for reducing hydrocarbons and volatile organic compound emissions in an exhaust stream. However, the configuration and operational requirements of these devices make them unacceptable for many applications. Fox example, burners require a high temperature flame, water curtains require a supply of water and activated carbon quickly clogs when subjected to particulate laden exhaust.

With regards to automobiles, catalytic converters having precious metals, such as a troy ounce of platinum, palladium or rhodium, are currently being used to reduce tailpipe emissions. These precious metals are expensive and have a limited world-wide supply. Thus, their availability is insufficient to meet world-wide requirements, particularly in developing countries.

Moreover, catalytic converters have a limited useful life, throughout which their efficiency diminishes. And, for some vehicle models, even a new catalytic converter is unable to meet vehicle emissions standards thereby requiring a plurality of catalytic converters to be placed in series in order to treat the exhaust. Once a catalytic converter is spent, the precious metals therein are not easily solvable and, therefore, are typically landfilled as a hazardous waste.

A relatively recent innovation for reducing pollutants in an exhaust stream is to apply a corona field to the exhaust. However, corona generating devices are very limited in the type of pollutants that they can remove from an exhaust. Accordingly, corona devices have no practical applicability for controlling emissions from most industrial sources or from vehicles.

An example of a corona discharge device is shown in U.S. Pat. No. 5,733,360 to Feldman, which discloses a method and device for chemically activating various constituents of a gas stream by use of a corona discharge. To create a corona field, Feldman uses fine, wire-like electrodes extending from one of a pair of discharge plates. The voltage is applied in such as manner and in such short duration as to suppress the formation of sparks across the gap between the electrodes. According to Feldman, the device seeks to reduce pollutants through the use of a spatially distributed corona discharge cloud.

Another example is U.S. Pat. No. 5,433,832 to Rich, which discloses a dielectric discharge device, also known as a "silent discharge" device, for reducing pollutants in an exhaust. The device applies voltage between electrodes to cause a cloud of electrons and ions to be formed between the electrodes. To ensure that the electron/ion cloud is created, one of the electrodes is encased in a dielectric and the voltage is applied in such as manner as to prevent arcing between the electrodes.

Henis, U.S. Pat. No. 3,983,021, is also a corona discharge reactor known as a "silent discharge" reactor. The reactor removes nitrogen oxides from gases by solids contact and electric discharge. The electric discharge utilizes a dielectric and/or a packing material between electrodes to inhibit sparking or arcing between electrodes in order to generate a corona field.

An excited species generator is disclosed by Nunez, U.S. Pat. No. 5,236,672, which provides excited species to oxidize volatile organic compounds and other pollutants within a fluid stream. Electrodes of the excited species generator are fabricated from tungsten, or tungsten projections are applied to the electrodes, in order to allow for voltage to be provided across the electrodes without arcing or sparking.

An emission control device for reducing pollutants in an exhaust gas is shown by Masters, U.S. Pat. No. 5,410,871. The device includes a treatment chamber having a first metal screen, a second metal screen, and an electrode disposed a distance from the first screen. Voltage is supplied so that sparks are generated between the electrode and a concentrated location on the first screen. Consequently, the sparks traverse only a minute portion of the gas, leaving the vast majority of the exhaust gas unaffected.

In another patent to Masters, U.S. Pat. No. 5,419,123, an emission control device is described that includes a treatment chamber having a first metal screen, a second metal screen and a perforated chemical substrate disposed between the first and second screens. An electrode, disposed a distance from the first screen, is supplied a voltage so that sparks are generated between the electrode and a concentrated location on the first screen. Consequently, the sparks traverse only a minute portion of the gas while the chemical substrate treats the exhaust gas.

Birmingham et al., U.S. Pat. No. 4,954,320, discloses an alternating current discharge plasma device for decomposing toxic contaminants and removing hazardous aerosols in air. The device includes a nonconducting packing material disposed between two electrodes and a power supply to produce air plasma throughout the packing material.

In addition to the need for improved technology relating to reducing emissions from mobile and point sources, it is desirous to develop technology that generates a high concentration of ozone for a variety of other environmental purposes. For example, the introduction of ozone into cylinders of a vehicle's engine causes more complete combustion to occur. The superior combustion results in increased horsepower, improved mileage and a reduction in emissions.

Ozone is also effective in reducing bacterial and virus counts. As such, ozone can be used to treat effluent from municipal wastewater treatment plants. Currently, chlorine is typically mixed into an effluent to meet fecal chloroform and e-coli treatment standards. However, although chlorine dissipates quickly, an effluent containing chlorine is highly toxic to aquatic plants and animals. Chlorine is also deadly to humans, requiring extreme handling and storage safety measures to be taken.

Ozone may also be used for removing odors and smoke from an environment. For example, ozone closets may be used before dry cleaning in order to remove smoke from articles of clothing. As another example, ozone may be used to remove smoke, odors, air borne pathogens, or the like, from indoor air, such as a hotel room, factory or pub.

In practice, the beneficial uses of ozone have not been fully realized due to the inability of conventional ozone generating devices to cost effectively produce a sufficient quantity and concentration of ozone for the particular task. Other difficulties include that ozone breaks-down relatively quickly and that it is impractical to transport and store in quantity. As such, it is desirous to produce ozone at the point of intended use. Again, traditional ozone generating devices have not satisfied these needs.

In view of the forgoing, what is needed is for a device that reduces pollution from point source and mobile source exhaust streams. Additionally, there is a need for a device that enhances the performance and enlarges the effective life of a conventional catalytic converter as well as that of a catalytic converter having a reduced quantity of noble metals. There is also a need for a device that produces ozone in high concentrations for other environmental purposes such as improving combustion in a combustion engine, eliminating bacteria and purifying indoor air.

BRIEF SUMMARY OF THE INVENTION

To achieve the foregoing and other objects, the present invention, as embodied and broadly described herein, provides various embodiments of an arcing electron stream apparatus, and methods of using the same, for reducing emissions from a fluid and/or for generating ozone for various environmental applications.

In a preferred embodiment of the present invention, an arcing electron stream apparatus includes first and second electrodes. The electrodes are spaced apart by a distance thereby defining a volume between the electrodes wherein passing fluid is treated. A voltage source impresses a voltage between the first and second electrodes in order to create a plurality of arcs between the electrodes that breaks-down molecules, such as pollutants, within the fluid into their component parts.

In an embodiment of the present invention, the first electrode of the arcing electron stream apparatus includes a first surface having first and second sections, the first section being in closer proximity to the second electrode than the second section is to the second electrode in order to facilitate robust arc generation throughout the volume between the first and second sections of the first electrode and the second electrode.

In an embodiment of the present invention, openings may be formed through the first section, or through the first and second sections, of the first electrode in order to allow for fluid to pass through the electrode. Where both the first and second sections have openings, it is preferred that the openings in the first section be larger in cross-sectional area than are the openings in the second section.

In an embodiment of the present invention, the first and second sections are on different planes. Additionally, the first and second sections may be in different, parallel planes.

In another embodiment, arcing electron streams are progressively formed over the first and second electrodes such that the arcs traverse at least 50% of the volume between the electrodes in 10 seconds or less. In a more preferred embodiment, the arcs traverse at least 75% of the volume in 5 seconds or less.

In a preferred embodiment of the present invention, a method is provided for treating fluid in order to break-down molecules, such as pollutants, contained therein. The method includes the steps of providing first and second electrodes; impressing a voltage at a frequency between the electrodes; generating a plurality of arcing electron streams between the electrodes; and passing fluid between the electrodes so to subject the fluid to the arcing electron streams.

In an embodiment of the present invention, the method further includes the steps of subjecting at least 50% of the fluid to at least one of the arcing electron streams within a time period 10 seconds.

In an embodiment of the present invention, the first electrode of the method includes a first surface having first and second sections. The first section is positioned in closer proximity to the second electrode than the second section is to the second electrode. The generated arcing electron streams are created between the first section and the second electrode and also between the second section and the second electrode.

In an embodiment of the present invention, the method includes the step of creating an electric field gradient between the first and second electrodes. The electric field gradient is uniformly applied to the fluid in order to treat molecules entrained within the fluid.

In an embodiment of the present invention, the method includes the step of impressing a voltage difference of at least 20,000 volts between the first and second electrodes at a frequency of at least 1,600 pulses/minute.

BRIEF DESCRIPTION OF THE DRAWINGS

The above described and other features, aspects, and advantages of the present invention are better understood when the following detailed description of the invention is read with reference to the accompanying drawings, wherein:

FIG. 3 is a rear view of an embodiment of an electrode, having a stepped surface, that may be included in the apparatus of FIG. 1, in accordance with an embodiment of the present invention;

FIG. 4 is a front view of the electrode of FIG. 3;

FIG. 5 is a side view of the electrode of FIG. 3;

FIG. 6 is a rear view of another embodiment of an electrode, having a planer surface, that may be included in the apparatus of FIG. 1, in accordance with an embodiment of the present invention;

FIG. 7 is a front view of the electrode of FIG. 6;

FIG. 8 is a side view of the electrode of FIG. 6;

FIG. 9 is a rear view of another embodiment of an electrode, having a stepped surface with first and second sections wherein openings are only provided in the first section, that may be included in the apparatus of FIG. 1, in accordance with an embodiment of the present invention;

FIG. 10 is a front view of the electrode of FIG. 9;

FIG. 11 is a side view of the electrode of FIG. 9;

FIG. 15 is a rear view of another embodiment of an electrode, having a stepped surface wherein the surface has no openings, that may be included in the apparatus of FIG. 1, in accordance with an embodiment of the present invention;

FIG. 16 is a front view of the electrode of FIG. 15;

FIG. 17 is a side view of the electrode of FIG. 15;

DETAILED DESCRIPTION OF THE INVENTION

The present invention will now be described more fully hereinafter with reference to the accompanying drawings in which preferred embodiments of the invention are shown. This invention may, however, be embodied in many different forms and should not be construed as limited to the embodiments set forth herein. These exemplary embodiments are provided so that this disclosure will be both thorough and complete, and will fully convey the scope of the invention to those skilled in the art.

The present invention is a device for creating electron streams, in the form of arcs, and an electric field gradient for a variety of purposes. One such purpose is for reducing pollutants in a fluid. Another purpose is for creating ozone that may be used in a variety of applications. As used herein and not to be construed as limiting, the term "fluid" shall include ambient air, process gas streams, indoor air, exhaust, emissions, gases, air stream, and the like.

In an embodiment, the invented device accomplishes these purposes by causing arcing electron streams to traverse between electrodes. Specifically, arcing electron streams are caused to 'jump' from a multitude of locations, from one electrode to the other electrode, such that the electron streams substantially cover the entire volume between the electrodes within a relatively short period of time. As a result, virtually all of the molecules between the electrodes are subjected to electron-to-molecule impact which breaks some of the molecules into their component parts. As such, when the fluid being passed between the electrodes contains pollutants, the electron-to-pollutant impact breaks the pollutants into their component parts thereby reducing emissions. The arcing electron streams also break-down oxygen molecules within the fluid, thereby forming ozone that may be used in a variety of application.

In an embodiment, the present invention also applies an electric field gradient to the fluid in order to further breakdown pollutant molecules in the fluid. The electric field gradient is, in general, applied uniformly so that no fluid escapes treatment.

Figure 1:
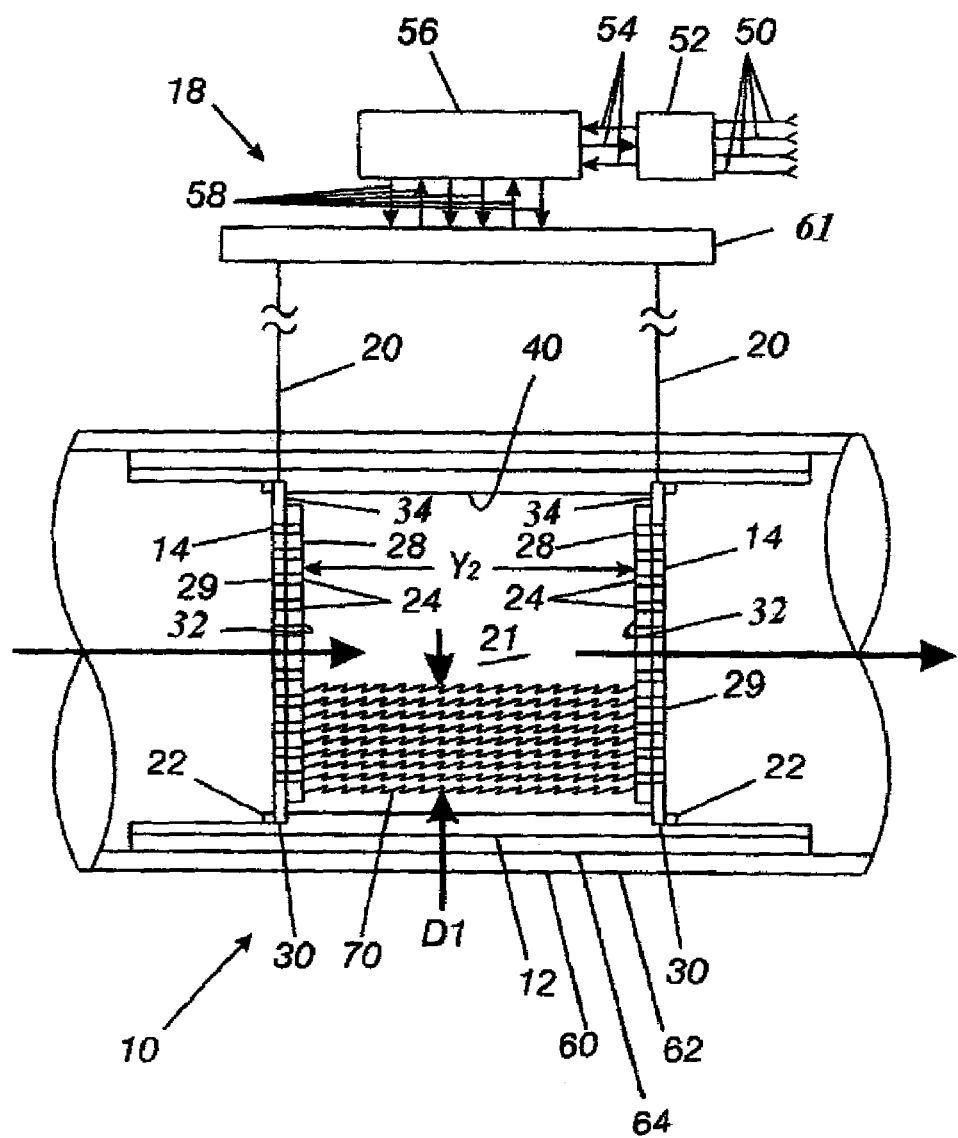
FIG. 1 is a cross-sectional view of an arcing electron stream apparatus, and a schematic of a voltage generation system for supplying voltage to the apparatus, for breaking-down molecules in a fluid, in accordance with an embodiment of the present invention.
Figure 2:
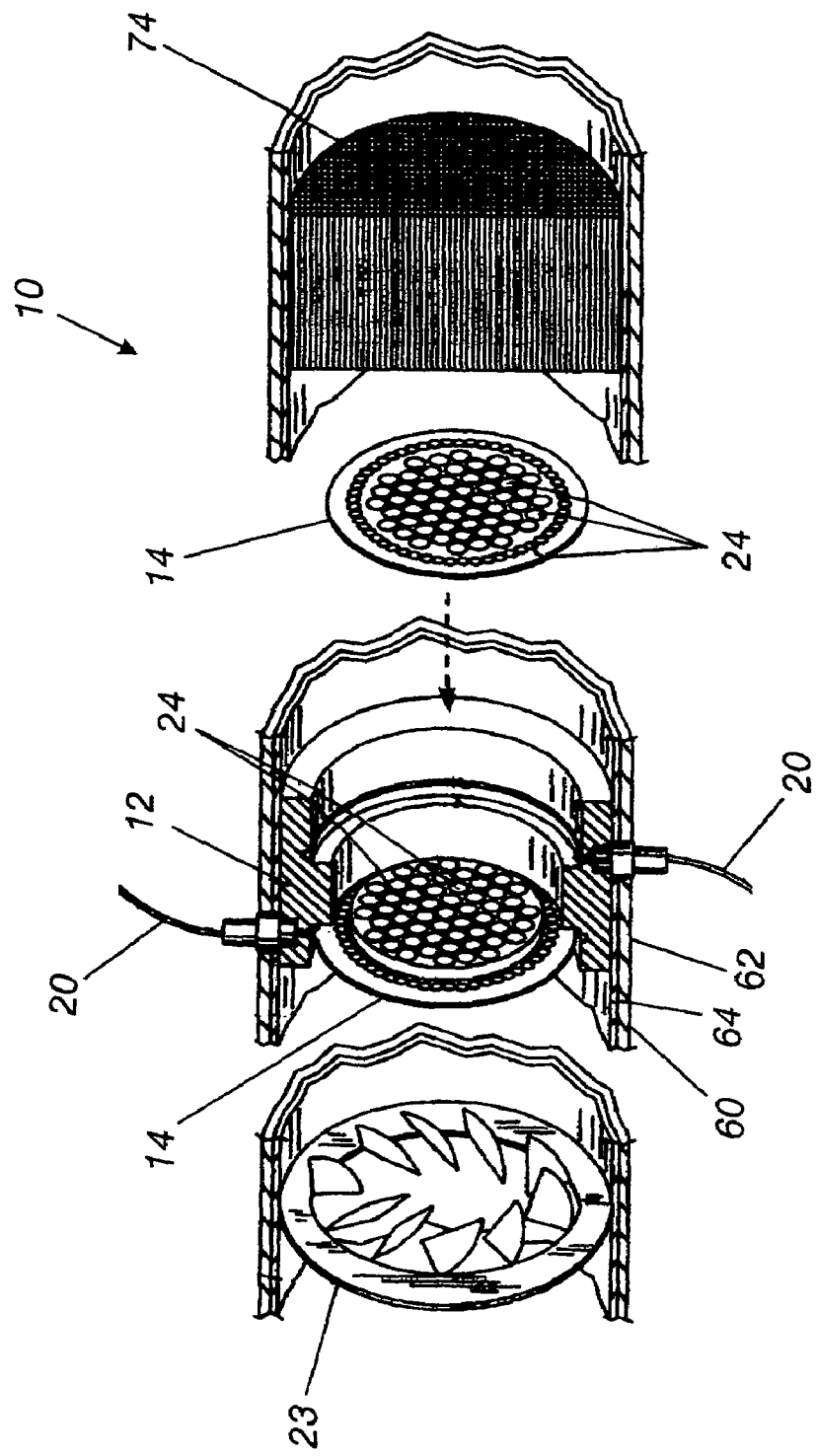
FIG. 2 is a fragmented cross-sectional view of the arcing electron stream apparatus of FIG. 1.

Referring to FIGS. 1 and 2, in an embodiment of the present invention, the invented apparatus 10 comprises a body 12; first and second electrodes 14 housed within the body 12 and spaced apart by a distance; a voltage generation system 18 (FIG. 1) for impressing voltage, at a frequency, between the electrodes 14 and at least one conductor 20 for supplying voltage, from the voltage generation system 18, to at least one of the electrodes 14. The body 12 and electrodes 14 define a chamber 21 (FIG. 1) there-between in which passing fluid is treated. The electrodes 14 may be removably fixed within the apparatus 10 by a retaining ring 22 (FIG. 1). Optionally, a vane 23 may be provided in order to enhance dynamic movement of the fluid through the apparatus 10.

The electrodes 14 preferably have the same configuration and, thus, are interchangeable. As the electrodes 14 may have the same configuration, the same reference numbers are used to identify common structural elements of the electrodes. Notwithstanding, the first and second electrodes 14 may have different configurations, as described below and shown in alternative embodiments. Accordingly, subparts to the reference numbers, such as "a", "b", or the like, are used to identify alternative embodiments.

The electrodes 14 are formed of a material capable of allowing a voltage difference to be impressed between the electrodes 14. Although not to be construed as limiting, suitable materials in which the electrodes 14 may be formed include stainless steel, chromium and magnesium alloy, wherein stainless steel is preferred due to its strength, corrosive resistant character, and conductive properties.

The electrodes 14 are disposed in the body 12, in parallel communication with each other, and in such a manner that all of the fluid is passed between the electrodes 14. In a preferred embodiment, fluid is passed through openings 24 in the first electrode 14, through the chamber 21 between the electrodes 14 then existed through openings 24 in the second electrode 14, as indicated by the arrows illustrated in FIG. 1.

Referring to FIGS. 1-4, the openings 24 in the electrodes 14 allow for fluid to pass through the apparatus for treatment. It is preferred that the openings 24 are cylindrical, that is, having an altitude and a circular cross-section along its altitude, and that the pattern, shape(s) and size(s) of the openings 24 are the same on each of the electrodes 14. Notwithstanding, the openings 24 are not limited to any particular size, shape, arrangement, configuration, number or pattern. Nor is it required that the openings 24 be the same on each of the electrodes 14. As used herein, the cross-sectional area of an opening is measured in a plane perpendicular to the opening's altitude, regardless of the shape of the opening.

In general, better electron stream movement throughout the chamber 21 is achieved by increasing the number of openings 24. As such, electrodes 14 having a greater number of smaller openings are preferred over having fewer, larger openings. It is also preferred that the openings 24 sufficiently allow for free fluid flow throughout the apparatus in order to avoid causing back pressure.

Referring to FIGS. 6-8, an alternative embodiment of an electrode 14a is illustrated having a planar first surface 28a, a second surface 29a and a perimeter surface 30a, wherein openings 24a extend through the electrode 14a from the first surface 28a to the second surface 29a. A pair of the electrode 14a may be positioned within the body 12 (the following description pertains to FIG. 1 as if electrodes 14a were illustrated therein instead of electrodes 14) such that the first surface 28a of each face each other and are parallel. Since all portions of each electrode first surface 28a are equal-distant from each other, and, as a general rule, arcing typically occurs between the closest points, arcing electron streams are caused to jump form a multitude of locations between the electrodes 14a. Notwithstanding that arcing occurs throughout the volume between the electrodes 14a, in practice, Applicants have determined that when using electrodes 14a having parallel, planar, opposed first surfaces 28a, arcs tend to form more frequently near the perimeter of the electrode 14a (i.e. nearer to an interior surface 40 of the body 12), rather than equally forming across the electrodes 14a (i.e. throughout the chamber volume 21) as desired.

It is theorized that this tendency for arcing electron streams to collect near the interior surface 40 of the body 12 is due to slower fluid movement near the interior surface 40 than at the center of the chamber 21, since, in general, arcing occurs more readily through slower moving fluid. As such, where arcing occurs depends not only on the distance between the electrodes but also on the fluid flow rates within the chamber 21.

Referring to FIGS. 3-5, a preferred embodiment of the electrode 14 is illustrated for overcoming the tendency of having electron streams collect near the interior surface 40 of the body 12 (FIG. 1). The electrode 14 comprises a first surface 28, a second surface 29 and a perimeter surface 30, wherein the first surface 28 includes a planar first section 32 and a planar second section 34. The first section 32 is extended from the second section 34 by an outwardly directed transition section 38. Openings 24 are provided through the electrode 14, from the first surface 28 to the second surface 29. Although not required, it is preferred that the openings 35 in the first section 32 be larger than the openings 36 in the second section 34 and that the second section openings 36 are numerous and closely positioned together in order to improve volumetric exhaust flow near the interior surface 40 (FIG. 1) of the body 12.

The second section 34 forms a perimeter around the first section 32 and is configured for being positioned adjacent to the interior surface 40 of the body 12 (FIG. 1). The transition section 38 perpendicularly projects the first section 32 from the second section 34. As such, the first and second sections 32, 34 of the electrodes 14 are parallel to each other while the transition section 38 is normal to the first and second sections 32, 34.

Referring to FIG. 1, when in operational position within the body 12, the electrodes 14 are configured so that the first sections 32 of the electrodes 14 are closer to each other than their second sections 34. By having stepped first surfaces 28, robust arc formation over the entirety of the electrode's first and second sections 32, 34 is induced and, accordingly, electrical arcing occurs throughout the chamber 21. It is to be understood that the term second section, as used herein, refers to the effective portion of the second section. That is, the portion of the second section that is exposed to communicate with the opposing electrode, as opposed to any remaining portion that is blocked by the body 12, such as the portion that is being used for holding the electrode 14 in position within the body 12. Additionally, as used herein, the terms "stepped" and "step" include any electrode configuration comprising a first surface having first and second sections, wherein the first section is disposed further outward than the second section such that arcing electron streams are formed on both the first and second sections. Accordingly, the electrode embodiments illustrated by FIGS. 1-5, 9-19 are considered stepped electrodes.

Referring to FIG. 1, it is theorized that the projected first section 32 facilitates robust arc movement by yielding a smaller gap between the first sections 32. This smaller gap requires less voltage difference for an arcing electron stream to form than does the greater gap between the second electrode sections 34 and, as such, offsets the effect of having slower gas movement near the body's interior surface 40. Ideally, the height of the steps is set so that the required arc-over voltage at the first sections 32 is about the same as the arc-over voltage for the longer separation distance between the second sections 34 where fluid flow is slower.

The specific dimensions of the electrodes 14, and the spacing there-between, depend on the character of the fluid, its flow rate, the applied voltage and frequency, among other factors. Not to be construed as limiting, following are examples of preferred electrode configurations.

In an example, the cross-sectional area of the electrode first surface 28 is sufficient to encompass the cross-section of the chamber 21 so that all emissions passing through the body 12 necessarily pass through the electrodes 14, as shown in FIG. 1. Referring to FIGS. 4 and 5, the first and second sections 32, 34 of the electrode 14 are concentric with the second section 34 forming an annular ring around the circular first section 32. The second section 34 has a radial span $X_1$ of about ⅛ inch (3.2 mm) or more so that the first section 32 is spaced by at least ⅛ inch (3.2 mm) from the interior wall 40 when the electrode 14 is positioned within the body 12 (FIG. 1). And, the first section 32 is projected by the transition section 38 a distance $Y_1$ of about 1/16 inch (1.6 mm) or more, and more preferably ⅛ inch (3.2 mm) or more, from the second section 34. Moreover, the diameter $X_2$ of the first section 32 is preferably at least one inch (25.4 mm), more preferably at least 2 inches (50.8 mm), however the particular diameter will depend on the application of the apparatus. In general, it is preferred that the area of the first section 32 is at least 0.78 in$^2$ (5.03 cm²), and more preferably at least 3.14 in² (20.26 cm²), while the effective area of the second section 34 is preferably at least 0.44 in² (2.84 cm²), and more preferably at least 0.83 in² (5.36 cm²).

Continuing with the examples, and not to be construed as limiting, the electrodes 14 are spaced apart a distance such that the distance between the first sections 32 is preferably at least 3/8 inch (9.5 mm) and the distance between the second sections 32 is at least 5/8 inch (15.8 mm).

The electrode configuration and spacing described above is suitable for treating automotive exhaust. It is noted that although specific examples are given, excellent results may be obtained despite deviating from these stated configurations and distances. Furthermore, although electrode configuration and the spacing between the electrodes 14 may vary depending on the application of the apparatus, the teachings herein for creating arcing electron streams remain consistent.

Not to be construed as limiting, FIGS. 6-17 illustrate alternative embodiments of electrodes that may be used in the invented apparatus. In general, aside from the noted differences, the above description and examples apply to the following embodiments.

In further detail of the embodiment previously described in reference to FIGS. 6-8, the electrode identified by reference number 14a is similar to the electrode 14 described in reference to FIGS. 3-5, but wherein the first and second sections 32a, 34a are in the same plane. In this embodiment, the second section 34a is the annular portion having smaller openings 36a that surrounds the perimeter of the circular first section 32a having larger openings 35a. In another embodiment (not shown), the electrode 14a may be provided with only the openings 35a through the first section 32a.

FIGS. 9-11 illustrate an embodiment of an electrode 14b that is similar to the electrode 14 described in reference to FIGS. 3-5, including a first surface 28b, a second surface 29b, and a perimeter surface 30b. The first surface 28b comprises a first section 32b, a second section 34b and a transition section 38b. However, openings 24b are provided only through the first section 32b and not through the second section 34b.

Figure 12:
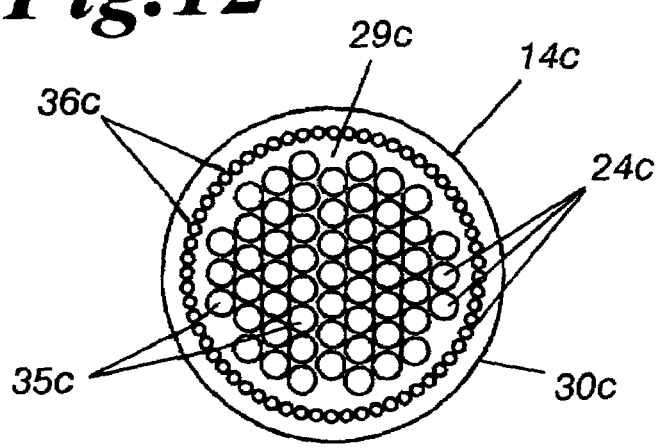
FIG. 12 is a rear view of another embodiment of an electrode, having a surface with a planar first section and an angled second section, that may be included in the apparatus of FIG. 1, in accordance with an embodiment of the present invention.
Figure 13:
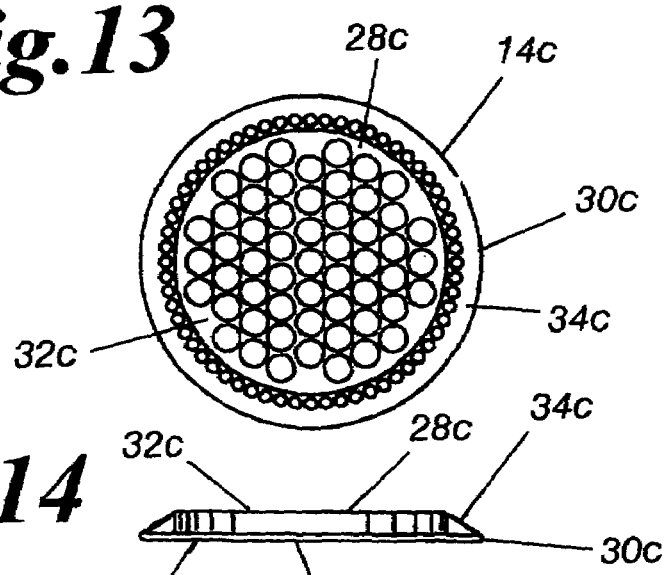
FIG. 13 is a front view of the electrode of FIG. 12.
Figure 14:
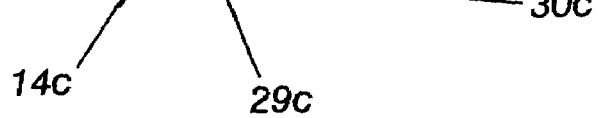
FIG. 14 is a side view of the electrode of FIG. 12.

FIGS. 12-14 illustrate an embodiment of an electrode that is identified by reference number 14c that is similar to the electrode 14 described in reference to FIGS. 3-5, including a first surface 28c, a second surface 29c, and a perimeter surface 30c. However, the first surface 28c comprises a planar first section 32c and an angled second section 34c. Openings 24c, 35c, 36c are provided through the first section 32c and the second section 34c. As another embodiment (not shown), the angled first section may instead be concave or convex.

Figure 18:
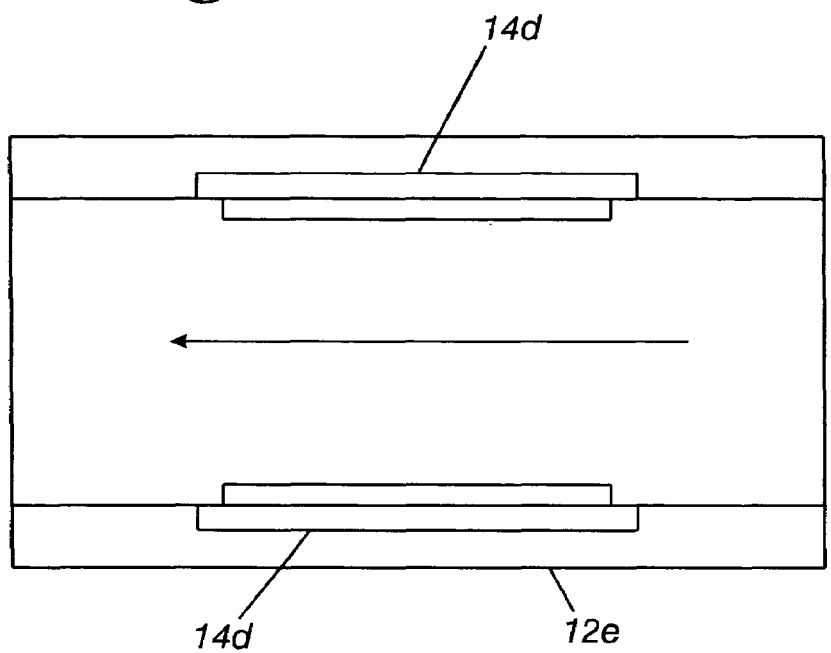
FIG. 18 is a cross-sectional side view of an embodiment of an arcing electron stream apparatus, similar to that shown in FIG. 1, but having electrodes positioned on opposed sides of the apparatus such that fluid passes between the electrodes, in accordance with an embodiment of the present invention.

Any of the electrodes described herein may also be formed without having openings. Such electrodes may be used where the placement of the electrodes still allows for fluid to be passed there-between. For example, FIG. 18 illustrates an embodiment wherein electrodes 14d without openings, such as the electrode described in accordance with FIGS. 15-17, are positioned on opposed sides of the body 12e. Passing fluid (identified by an arrow) is treated by arcing electron streams (not shown) that are generated between the electrodes 14d. It is to be understood that any of the other described electrodes may positioned on opposed sides of the body 12e as shown in FIG. 18.

Figure 19:
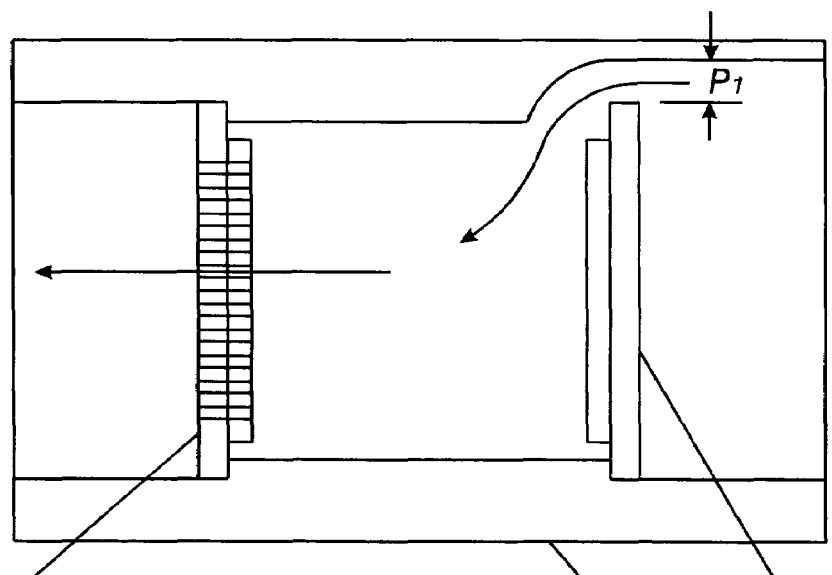
FIG. 19 is a cross-sectional side view of an embodiment of an arcing electron stream apparatus, similar to that shown in FIG. 1, but having an electrode without openings and another electrode with openings, in accordance with an embodiment of the present invention.

FIG. 19 illustrates another example in which openings through an electrode are not required. Here, the body 12f is provided with a passage P1 through which fluid (identified by an arrow) may pass around an electrode, such as the electrode 14d described in accordance with FIGS. 15-17, in order to be subjected to arcing electron streams (not shown). FIG. 19 also illustrates that different electrodes may be paired together. In this example, the electrode 14d is being paired with an electrode having openings through its second section such as the electrode 14b that is described in accordance with FIGS. 9-11.

For each of the electrode embodiments, although it is preferred that the first section be planar, it may also be slightly convex, or even have minor bumps, depressions or undulations. Applicants theorize that robust arcing still occurs with a slightly convex second section since the potential for arcing due to the closer proximity between the center of the electrodes is offset by the slower fluid flow near the interior surface 40 of the body 12 (FIG. 1).

Moreover, the electrodes described herein may have a cross-section other than circular. For example, the first section and/or the second section of the electrodes may have an oval cross-section, a rectangular cross-section, or other cross-section.

For each electrode embodiment, it is preferred that the electrode be formed as one unitary body by conventional methods, such as by machining or casting. It is believed that an electrode having a unity construction provides better arcing movement thereon. Applicants theorize that if the electrode was made of separate sections that were affixed together, interstitial spaces between the sections may reduce arcing electron stream formation.

Regarding, in general, the openings in the electrodes. The openings 24 may be provided in just the first section 32 (FIG. 7), or in the first and second sections 32, 34 (FIG. 4). The openings need not be the same size. For example, the size of the openings in the first and/or second section may vary. Additionally, the openings 24 in the first section 32 may be of a different size than the openings 24 in the second section 34. In general, it is believed that having smaller openings 24 in the second section 34, as compared to those in the first section 32, provides better arcing electron stream movement. Any such advantage may be due to a venturi affect caused by such an arrangement of openings 24 and/or by allowing for increased fluid flow near the interior surface 40 of the body 12 (FIG. 1).

Referring to FIG. 1, the chamber 21 is a volume, defined by the body 12 and the electrodes 14, wherein passing fluid is treated. The preferred chamber volume is cylindrical with a cross section that is about the same size as the enclosed electrodes 14. The shape of the chamber 21 accommodates arcing and an electric field gradient throughout the entire chamber 21. That is, it is preferred that there is no structure or obstruction within the chamber 21 between the electrodes 14.

The body 12 is constructed of a material, preferably a ceramic, capable of preventing voltage bleed-through between either of the electrodes 14 and any conductive structure that is outside of the body 12. Acceptable ceramics include cordierite and steatite, among others. Steatite is an excellent insulator, having favorable electrical properties. Cordierite is shatter resistant against thermal shock and, as such, has utility for when the body 12 would be subjected to sudden temperature changes due to the specific application. Optionally, the interior surface of the body 12 may be glazed to obviate residue build-up. The glazing is particularly useful in 'wet' fluid applications, such as when the apparatus is to be used for treating fluid from a diesel source.

Referring to FIGS. 1 and 2, a protective housing 60 may be provided to protect the body 12 from being damaged by its environment. The housing 60 also facilitates the attachment of the apparatus 10 to the source being treated. In the context of automotive usage, a typical housing 60 would include a metal shell 62 enclosing the body 12 wherein the metal shell 62 is adopted for attachment to an automobile's tailpipe. A vermiculite barrier 64 may be disposed between the body 12 and shell 62, filling the space there-between, to reduce vibration.

Referring to FIG. 1, a preferred embodiment of a voltage generation system 18 is illustrated for impressing voltage between the electrodes 14 at a desired frequency, and in such a manner that arcing electron streams are generated. The voltage generation system 18 includes transducers 50 for supplying signals to a sensor 52 regarding the fluid source, environmental conditions, and/or character of the fluid. For example, with regards to a vehicle, the operating condition of the engine and fluid characteristics may be identified. The sensor 52 integrates all of the signals into a cohesive situational analysis.

The situational analysis is transmitted from the sensor 52, over information pathways 54, to a voltage controller 56 wherein the situational analysis is converted into a set of commands. The set of commands is dialoged via two-way channels 58 to a voltage generator 61 to dictate to the voltage generator 61 how to generate the optimum arc frequency, duration and intensity. The channels 58 are two-way so that the voltage generator 61 and voltage controller 56 communicate as to the dynamics of voltage generation, since arc resistive conditions change on an arc-to-arc basis. That is, the voltage generator 61 communicates to the voltage controller 56 whether optimum arcs are being generated. The voltage controller 56, upon receiving this information, sends a new set of commands back to the voltage generator 61 for generating the next arc.

The entire sequence of having the sensor 52 receive information as to the condition of the source, environment and fluid, relaying that information to the voltage controller 56, which, in turn, commands the voltage generator 61 as to how to generate optimum frequency, duration, and intensity arcs, continues indefinitely. The sequence assures that the arcs are continuously optimized for maximum fluid treating, but without consuming excessive energy.

It is to be understood that dynamic voltage generation systems other than that described in the preferred embodiment may also be suitable.

As another alternative, the apparatus may use a 'fixed' voltage generation system. That is, a voltage generation system may be configured to apply a predetermined voltage between the electrodes 16. As a further option, the voltage may be impressed between the electrodes 16 at a constant frequency.

The applied voltage may be either AC or DC. Notwithstanding, DC power will typically be used since it allows for the power source to be a battery. For example, in an automotive context, the voltage generation system may be powered by a car battery.

As yet another option, the voltage polarity can be reversed half-way through arc-over so that the arcing electron streams originate from one electrode, then complete the path from the other electrode.

In an embodiment, the voltage is applied to one electrode while the other electrode is grounded. For example, the voltage generation system 18 may be operably attached to either the first or the second electrode 14 while the remaining electrode is grounded.

In another embodiment, the electrodes 14 may be electrically "floating". That is, neither electrode 14 is connected to ground. Instead, the electrodes 14 are operationally attached to the voltage generation system 18 whereby the system 18 applies a voltage difference between the electrodes 14.

Several advantages may be gained by floating the electrodes 14. One advantage is that interference with the ground system of the source to which the treatment apparatus 10 is applied is eliminated. Many machines, such as, for example, automobiles, depend on an uncompromised ground system to operate reliably. Hence, retrofitting and grounding the treatment apparatus 10 to the original grounding system could disrupt the automobile's function.

Another advantage of floating the electrodes 14 is that electromagnetic interference (EMI) caused by the conductors 20 may be partially canceled by arranging the conductors in close proximity to each other. Cancellation of EMI is important in automotive applications and other applications which are integrated with EMI-susceptible electronics because EMI may adversely affect such electronics. For example, in automotive applications, EMI may cause false signals to be sent to the automotive computers and electronics.

EMI cancellation may be provided by running the conductors 20 in close, parallel but opposite directions. That is, EMI can be significantly reduced by holding the positive and negative going conductors as close as possible together, because the EMI generated by the positive conductor would be partially canceled by the EMI of the negative, return, conductor. The closer together the conductors are positioned, the better the EMI cancellation.

In contrast, by connecting a conductor to ground, this manner of EMI cancellation is virtually eliminated because the return path is literally the entire vehicle. Thus, the EMI generated by the conductors cannot be parallel matched to cancel the same.

In operation, the voltage generation system impresses voltage between the grids at a frequency to treat the fluid being passed through the treatment apparatus. Preferred results for pollutant reduction occur at an initial voltage difference impressed between the electrodes of at least 20,000 volts at a pulse rate of at least 1,600 pulses per minute. More preferably, the initial voltage is impressed in the range of 40,000 volts to 100,000 volts at a frequency of 1,600 to 10,000 pulses per minute. Typically, the running voltage is approximately ⅓ to ⅔ of the initial voltage. As used herein, "initial voltage" is gap voltage impressed during start-up of the treatment apparatus. Whereas, "running voltage" is the gap voltage impressed during continued operation of the treatment apparatus.

Notwithstanding the above ranges, the optimal voltage and pulse rate will vary depending on characteristics of the fluid, fluid flow rate, operating criteria of the source, environmental conditions, or the like. In general, wetter fluid, such as emissions from a diesel internal combustion engine, require higher voltage and pulse frequency than emissions from lighter fuels, such as unleaded gasoline or propane.

For exemplary purposes and not to be construed as limiting, in the context of reducing pollutants in exhaust from an automobile, the preferred initial voltage impressed between the electrodes is at least 20,000 volts at a pulse rate of at least 3,000 pulses/minute/cylinder. For example, with a six cylinder gasoline powered automotive internal combustion engine, a voltage difference between 40,000 to 60,000 volts at 18,000 to 48,000 pulses minutes is preferred for optimizing pollutant reduction.

Referring to FIG. 1, the combination of the configuration of the electrodes 14 at the above stated operating conditions surprisingly causes a multitude of arcing electron streams to 'jump' from a multitude of locations from the first electrode 14 to the second electrode 14, such that electron streams substantially cover the entire volume 21 between the electrodes 14 within a relatively short period of time. By doing so, substantially all of the passing fluid is bombarded by one or more of the electron streams. Accordingly, nearly all fluid is subjected to electron-to-molecule impact which breaks the molecules in the fluid into their component parts, causing a significant amount of ozone to be created and causing pollutants within the fluid to be broken down. Not to be construed as limiting, preferably at least 50%, more preferably at least 75%, and most preferably at least 90%, of the fluid is directly subjected to an arcing electron stream before exiting the treatment chamber 21. Similarly, arcing electron streams traverse preferably at least 50%, more preferably at least 75%, and most preferably at least 90%, of the chamber volume 21. The preferred time period for arcing electron streams to traverse the above stated volume is preferably 10 seconds or less, more preferably 5 seconds or less, and most preferably 3 seconds or less. In general, it is preferred that the arcing electron streams traverse the chamber volume in the above stated volume percentages in a time period that is less than the time necessary for fluid molecules to ingress then egress the chamber 21.

It was also unexpected that not only are the arcs 70 caused to 'move' throughout the chamber 21, they are also caused move through the chamber 21 in a 'cluster'. As used herein, a cluster of arcs 70 is a grouping of arcing electron streams that are in close proximity to each other, such that the arcs generally appear as one large arc. The arc cluster 70 preferably has a 'diameter' D1 of at least ¼ inch (6.3 mm) and more preferably at least ½ inch (12.7 mm). As used herein, the term "diameter", when associated with the term cluster 70, refers to an average diameter of the cluster 70 since the cluster cross-section only approximates a circle.

It is theorized that the movement of arcing electron streams 70 throughout the chamber 21 is due in part to a refractory mechanism. The refractory mechanism drains the available electrons from a refractory area on the electrode 14 by the operation of heating the refractory area, depleting electrons from the refractory area, and reducing gas ions in the immediate area around the refractory area, due to recent arc-over. Thus, the refractory mechanism raises the required arc-over voltage at a refractory area from where an arc had just been formed.

As a result of this refractory voltage-raising process, the next arc will be more likely to form from another location on the electrode 70 than from the refractory area. The effect of the refractory mechanism generally lasts from fractions of a second to seconds, after which time the refractory area gradually decays to become an area that is equally likely to have an arc originate there-from.

At the above described voltages and arc frequencies, each new arc will form over a progressively different area before finally returning back to the original area. During the continuous arcing, the electrodes 14 are pocked with refractory areas, each at a various level of decay. In this manner the arcs will uniformly progress over the entire electrode first surface 28 before returning to the starting area and repeating the process.

In general, by setting the arc frequency sufficiently high, the sequential arc progression covers the entire first surface 28 of the electrodes 14, and the chamber volume 22 between the electrodes 14, in less time than it takes fluid molecules to make it through the chamber. By forming arcs sequentially throughout all of the chamber 21, each fluid molecule will be subjected at one or more arcs from close proximity before exiting the treatment apparatus 10.

It is noted that the effectiveness of an arc depends on the arc intensity and duration, which are controlled by the applied voltage and frequency. Arc intensity is taken to mean the rate of flow of electrons across the volume between the electrodes. As an initial rule, for any arc to gas molecule distance, the higher the arc intensity and duration, the greater the arc's cleansing action. There reaches a point of diminishing returns, however, where further increases in the arc's intensity and duration causes progressively less cleansing action while requiring more electrical energy.

It is believed that the refractory mechanism in conjunction with the electrodes 14 being spaced apart by different distances between their first and second sections 32, 34 provide the preferred robust movement of arc cluster along the electrodes 14 and throughout the chamber 21. It is further believed that wherein the refractory mechanism, as dictated by the voltage and frequency inputs, causes the arcing to progressively move along electrodes 14 and throughout the chamber 21, and that the first and second sections 32, 34 assist in causing the arcs to move along the electrodes 14 and chamber 21 by keeping the arcs from disproportionately forming near the interior surface 40 of the body 12.

The apparatus 10 also treats the fluid with an electric field gradient. The electric field gradient is, in general, unidirectional and uniformly applied. By uniform, it is meant that the electric field gradient, at all points from a given distance from the electrode's first surface 28 will be about the same.

The uniform electric field gradient stems from the geometry of the electrodes 14 and the voltage potential between the electrodes 14. As molecules pass through the openings 24 in the first electrode 14, they are immediately and uniformly subjected to the electric field voltage gradient. This exposure is generally uniformly applied equally on all the molecules for the entire travel through the chamber 21 until they exit the chamber 21 through the openings 24 in the second electrode 14.

Referring to FIG. 2, when using the invented apparatus 10 for reducing pollutants in a fluid by reducing pollutants therein, a catalyst 74 may also be used to further treat the fluid. The catalyst 74 may be carried on a strata, such as a honeycombed metal or silica strata, through which the fluid is passed. For example, in automotive context, a catalytic converter may be used with the catalyst 74 being a noble metal such as palladium, platinum or rhodium.

Through testing, applicants have verified that use of the treatment apparatus 10 in conjunction with a conventional catalytic converter produces impressive results, reducing pollutants from automobile emissions well below the levels obtainable by the catalytic converter alone. Furthermore, startling results where also obtained when the treatment apparatus 10 was used with a properly aged conventional catalytic converter. Aging is the process by which the catalytic converter is destroyed to determine its warranted shelf-life on a vehicle. Despite the aged catalytic converter, exceptional pollutant reduction was achieved as well as prolonged the life of the catalytic converter.

Additionally, the treatment device 10 also provides dramatic emissions reduction even when used in a catalytic converter having a significantly reduced amount of catalyst. For example, substantial emissions reductions are achieved even though the amount of catalyst in a catalytic converter is reduced from a typical amount of one troy ounce to ¹⁄₁₀ of a troy ounce.

It is noted that additional components may be added to the present invention. For example, additional electrodes may be added in series to further treat fluids passed there-through. As another example, ionized gas may be supplied to the system in order to further enhance pollutant reduction by the apparatus.

Moreover, the high concentration of ozone that may be produced by the apparatus 10 may be used for a variety of purposes. For example, ozone created by passing ambient air though the apparatus 10 may be used for purifying air, elimi- That which is claimed is:

1. An apparatus for creating arcing electron streams for treating a fluid, comprising:
   a first electrode;
   a second electrode spaced from said first electrode by a distance and defining a volume between said first and second electrodes;
   a voltage source adapted for impressing a voltage between said first and second electrodes;
   wherein a plurality of arcing electron streams are generated between said first and second electrodes;
   wherein said first electrode includes a first surface having first and second sections, wherein said first section is closer in proximity to said second electrode than is said second section; and
   wherein said first surface is stepped.

2. The apparatus according to claim 1 wherein the arcing electron streams are formed between said first section and said second electrode and between said second section and said second electrode.

3. The apparatus according to claim 1 wherein said first section has a plurality of openings that extend through said first electrode.

4. The apparatus according to claim 3 wherein said second section has a plurality of openings that extend though said first electrode.

5. The apparatus according to claim 1 wherein said first section is in a first plane and said second section is in a second plane.

6. The apparatus according to claim 5 wherein said first section is parallel to said second section.

7. The apparatus according to claim 1 wherein said first electrode further includes a transition section between said first and second sections, wherein said transition section projects said first section outwardly from said second section.

8. The apparatus according to claim 1 wherein said second section is disposed outward of the perimeter of said first section.

9. The apparatus according to claim 1 wherein said first section is planar and has an area that is at least 0.78 in$^2$ (5.03 cm$^2$).

10. A method for creating arcing electron streams for treating a fluid, the method comprising the steps of:
    providing first and second electrodes;
    impressing a voltage at a frequency between said first and second electrodes;
    generating a plurality of arcing electron streams between said first and second electrodes;
    passing a fluid between said first and second electrodes;
    subjecting the fluid to the plurality of arcing electron streams;
    wherein said first electrode includes a first surface having first and second sections, wherein the arcing electron streams are created between said first section and said second electrode, and between said second section and said second electrode, and wherein said first section is in closer proximity to said second electrode than said second section is to said second electrode; and
    wherein said first surface is stepped.

11. The method according to claim 10 further including the step of subjecting at least 50% of the fluid to at least one of the arcing electron steams.

12. The method according to claim 10 further including the step of creating an electric field gradient between said first and second electrodes wherein the electric field gradient is uniformly applied to the fluid.

13. The method according to claim 10 further including the step of impressing a voltage of at least 20,000 volts between the first and second electrodes at a frequency of at least 1,600 pulses/minute.

14. The method according to claim 10 wherein each of said first and second electrodes include openings, and further including the step of passing said fluid through said openings.

15. The method according to claim 10 further including the steps of providing a body; wherein said body, said first electrode and said second electrode define a volume; traversing at least 50% of said volume with said plurality of arcing electron streams in 10 seconds or less.

* * * * *